US009703517B2

(12) United States Patent
Andolina

(10) Patent No.: US 9,703,517 B2
(45) Date of Patent: Jul. 11, 2017

(54) EXTERNAL DEVICE SCREEN TARGETING

(71) Applicant: Adobe Systems Incorporated, San Jose, CA (US)

(72) Inventor: Joseph Michael Andolina, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 168 days.

(21) Appl. No.: 14/475,321

(22) Filed: Sep. 2, 2014

(65) Prior Publication Data

US 2016/0063956 A1    Mar. 3, 2016

(51) Int. Cl.
*G09G 5/12* (2006.01)
*G06F 3/147* (2006.01)
*G06F 3/14* (2006.01)
*H04N 21/422* (2011.01)
*G06F 3/0346* (2013.01)

(52) U.S. Cl.
CPC .......... *G06F 3/1446* (2013.01); *G06F 3/0346* (2013.01); *H04N 21/42204* (2013.01); *G06F 3/1454* (2013.01); *G09G 2354/00* (2013.01)

(58) Field of Classification Search
CPC ...... G09G 5/12; G06F 3/147; G08C 2201/50; G08C 2201/51; G08C 2201/70; G08C 2201/71; G08C 2201/91; G08C 2201/93; G08C 23/04; G08C 17/02; H04N 2005/4407; H04N 2005/4408; H04N 2005/4426; H04N 2005/4433; H04N 2005/4442; G05B 2219/31102
See application file for complete search history.

(56) References Cited

U.S. PATENT DOCUMENTS

| | | | | |
|---|---|---|---|---|
| 7,877,588 B2* | 1/2011 | Gharapetian | .......... | G08C 17/02 341/174 |
| 9,117,365 B2* | 8/2015 | Yano | ....................... | G08C 23/04 |
| 2005/0017949 A1* | 1/2005 | Dunn | ..................... | G08C 17/02 345/158 |
| 2007/0252721 A1* | 11/2007 | Geurts | .................. | G06F 3/0325 340/4.31 |
| 2010/0253623 A1* | 10/2010 | Wei | ....................... | G06F 3/0346 345/158 |
| 2010/0321410 A1* | 12/2010 | Jenks | .................... | G06F 3/1446 345/676 |
| 2011/0093799 A1* | 4/2011 | Hatambeiki | ........... | G08C 17/02 715/763 |
| 2014/0267554 A1* | 9/2014 | Yu | ............................ | H04N 7/15 348/14.07 |
| 2015/0363154 A1* | 12/2015 | Frederick | ............... | G08C 17/02 345/1.3 |

* cited by examiner

*Primary Examiner* — Jennifer Mehmood
*Assistant Examiner* — Sardis F Azongha
(74) *Attorney, Agent, or Firm* — Wolfe-SBMC

(57) ABSTRACT

Techniques for external device screen targeting are described. In one or more implementations, location information of a mobile computing device is calculated based on a distance between the mobile computing device and multiple signal transmitters having predefined locations. In addition, a compass heading of the mobile computing device is identified that indicates an orientation of the mobile computing device. The location information and the compass heading of the mobile computing device is then applied to correlate with display-location data of an application for interaction with one or more objects displayed on a display device.

20 Claims, 6 Drawing Sheets

EXTERNAL DEVICE SCREEN TARGETING

BACKGROUND

Conventional techniques used for remote control devices can be inefficient in systems that utilize multiple display screens to display content. For example, conventional remote control devices lack the ability to interact individually with the multiple display screens and/or with displayed content that is split across the multiple display screens. Further, some devices that can be used as remote control devices, such as mobile phones, tablets, and so on, may lack the ability to target a display screen from the multiple display screens or target a region on the display screen.

Conventional techniques used to target the display screen with an external device, such as a remote control device, include consumer IR (infrared) devices that issue commands via IR light to a destination device that controls the display screen. These IR devices, however, generally require line-of-sight to operate the destination device, and communication between the IR devices and the destination device can be blocked by a tangible object obstructing the line of sight. Other conventional techniques include radio frequency (RF) remote controls which use radio signals transmitted by the remote control device. These RF remote controls, however, lack the ability to target a particular display screen from the multiple display screens. Additional techniques for screen targeting utilize a pre-established Bluetooth connection between the remote control device and the destination device. However, pairing Bluetooth devices prior to operating the destination device with the remote control device can be complex and time consuming.

SUMMARY

Techniques for external device screen targeting are described. In one or more implementations, location information of a mobile computing device is calculated based on a distance between the mobile computing device and multiple signal transmitters having predefined locations. In addition, a compass heading of the mobile computing device is identified that indicates an orientation of the mobile computing device. The location information and the compass heading of the mobile computing device are then applied to correlate with display-location data of an application for interaction with one or more objects displayed on a display device.

In at least one approach, a physical location of a mobile device is determined based on a distance between the mobile device and each of a plurality of signal transmitters. Additionally, a compass heading is received that identifies an orientation of the mobile device. Then, a display location on one of multiple display screens is determined that corresponds to the orientation of the mobile device. In some implementations, the display location on the display screen is determined from the physical location of the mobile device, the compass heading, and a direction of a longitudinal axis of the display screen.

In an example implementation, a display device or a location on the display device is targeted based on data received from a mobile device. In an example, the data indicates a physical location of the mobile device relative to a plurality of signal transmitters that correspond to known locations. The data also indicates an orientation of the mobile device. In addition, the data is applied to screen location data of an application to allow the mobile device to interact with displayed objects that correspond to the display device or the location on the display device that corresponds to the orientation of the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
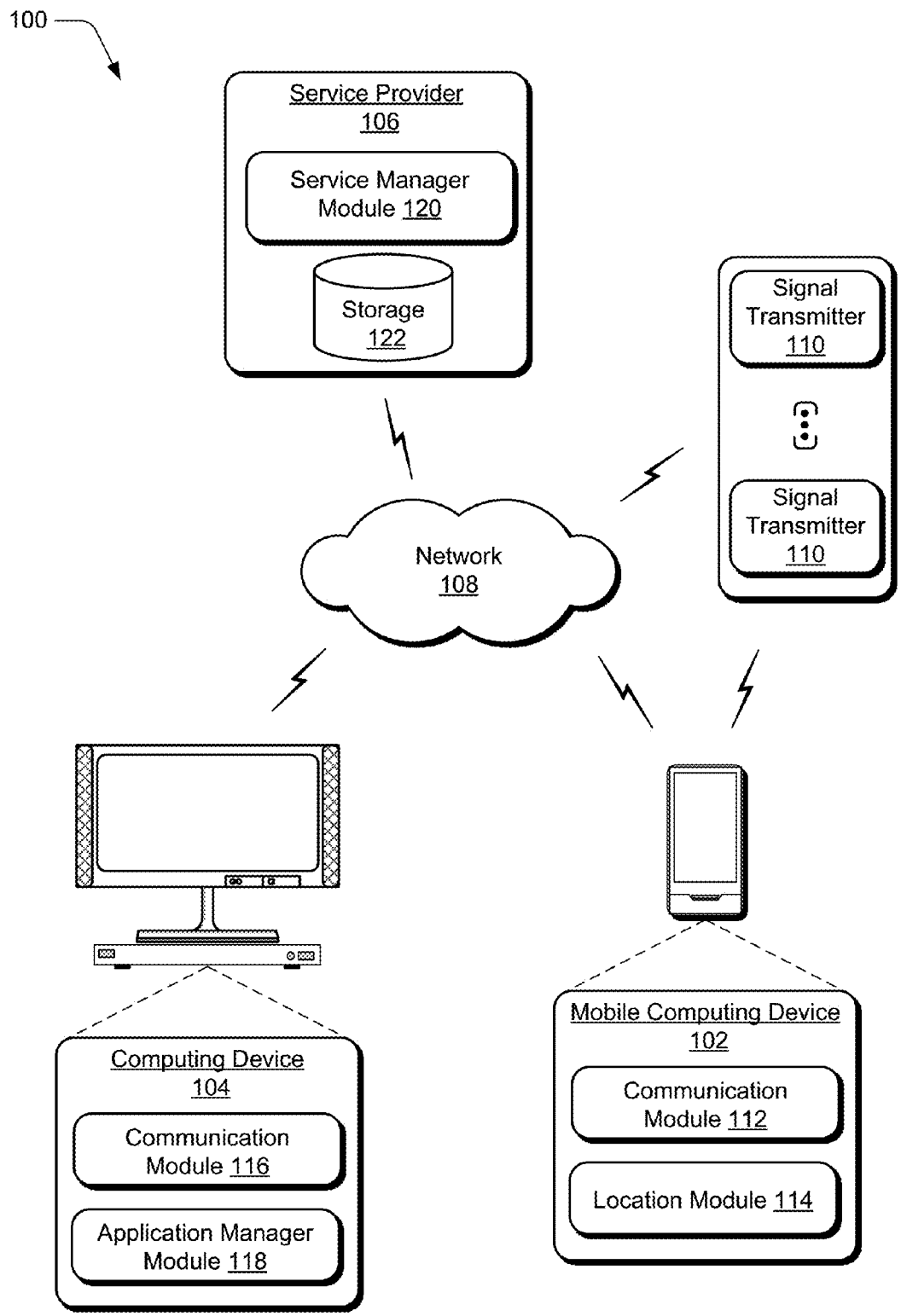
FIG. 1 is an illustration of an environment in an example implementation that is operable to employ techniques for external device screen targeting.

Conventional techniques used for remote control devices can be inefficient in systems that utilize multiple display screens to display content. For example, conventional remote control devices lack the ability to interact individually with the multiple display screens and/or with displayed content that is split across the multiple display screens. Some examples of conventional techniques utilized in remote control devices included IR light, RF signals, or a Bluetooth connection. However, IR light requires line-of-sight that can be easily obstructed by interfering objects, RF signals generally lack an ability to target a specific location such as a display screen, and a Bluetooth connection is generally required to be pre-established prior to being able to issue commands to a destination device. Additionally, using these conventional techniques, a multi-screen application that controls a display of content over multiple display screens cannot determine which display screen is being pointed at by the mobile device or which region on a particular display screen is being targeted by the mobile device.

Techniques involving external device screen targeting are described. In the following discussion, a variety of different implementations are described that involve targeting a display screen from among multiple display screens utilized to display one or more applications. In one example, a system including multiple display screens can display a multi-screen application such that different portions of content of the application are displayed on different display screens. For example, a single user interface can be split across the different display screens. To determine which particular display screen a user desires to interact with using a mobile computing device, the mobile computing device's location and orientation can be calculated and applied to correlate with display-location data of the application. Further, using the device's location and orientation information, the application can enable interaction with one or more objects displayed on the particular display screen(s).

In at least one implementation, the mobile computing device's location can be computed via triangulation. In addition, the mobile computing device's orientation can be determined based on a compass heading of the mobile computing device. In one example, the orientation can indicate a direction in which the mobile computing device is pointing relative to a compass heading or a longitudinal axis of the display screen(s). Further discussion of these and other features is provided in greater detail below.

The implementations described herein provide the ability for mobile devices to interact with single and multi-screen applications at a previously unachievable granularity. Using the techniques described herein, users can select and interact with multiple screens and regions on screens, such as for game play, shopping, collaboration, and so on. In one example, a user can have six different display devices (e.g., televisions) concurrently displaying different television shows, such as different football, baseball, and basketball games. Using the techniques described herein, the user can operate each of the display devices individually with a single remote control, such as a mobile phone, simply based on where the user points the remote control. In another example, consider a collaboration environment where multiple objects are presented to an audience of users via a display screen, and the users are asked to vote for their favorite object. Using the techniques described herein, each user can use his or her own mobile device to individually select, or vote for, one of the objects displayed on the display screen, at the same time as the other users select their favorite object. Consequently, each of the users can target an object for selection simply based on where the user points his or her respective mobile device. Additionally, each user can select a respective target object via a user input to the respective mobile device. These and other examples are described in greater detail below.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

As employed herein, the term "application" may refer to computer software that causes a computer to perform useful tasks. Some examples of applications can include a software application, an application program, a mobile app, a desktop application, and so on. Additional examples of applications include web browsers, email programs, word processors, games, utilities, social networking applications, instant messaging applications, and so on. In at least some embodiments, an application may represent a service that is accessible over a network, such as a cloud based service, a distributed application, and so forth. Thus, an application is not limited to functionalities installed locally on a client device.

As employed herein the term "multi-screen application" may refer to an application that is configured to utilize multiple integrated display screens to display content. The multi-screen application can be configured to initiate a display of a user interface that is split across two or more of the display screens, such that different portions of the user interface are displayed on different display screens. The multi-screen application can be interactive and/or collaborative to allow one or more users to interact with the different portions of the user interface via respective display screens. Additionally, the multi-screen application can be configured to initiate a display of a user interface on one display screen and a copy of the user interface on another display screen. Thus, the multi-screen application can utilize multiple display screens in any of a variety of ways.

As employed herein, the term "object" is representative of a location in memory having a value and referenced by an identifier. An object can be a data structure, a variable, a function, an instance of a class, a table, a column, an association between data and a database entity, and so on. Some examples of objects can include files, text, images, audio data, video data, audio/video data, and so on. Thus, the term "object" can represent any of a variety of objects.

As employed herein, the term "content" is representative of data, such as text content (e.g., messages), photographs, video, audio, and so on. Additionally, the content can include one or more objects. The content can be displayed for the user, and can be selectable by the user to perform one or more actions. Further examples of the above-described terms may be found in relation to the following discussion.

Example Environment

FIG. 1 is an illustration of an environment 100 in an example implementation that is operable to employ techniques described herein. The illustrated environment 100 includes a mobile computing device 102, a computing device 104, and a service provider 106 that are communicatively coupled via a network 108. In addition, the mobile computing device 102 can be communicatively coupled to a plurality of signal transmitters 110, either through the network 108 or directly through other wireless means. The mobile computing device 102, the computing device 104, as well as computing devices that implement the service providers 106 may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 106 utilized by a business to perform operations "over the cloud" as further described in relation to FIG. 6.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

The signal transmitter(s) 110 is representative of functionality to transmit a signal to enable the mobile computing device 102 to determine a distance between the signal transmitter 110 and the mobile computing device 102. For example, the signal transmitter(s) 110 can be configured to transmit a low energy signal, such as a Bluetooth low energy signal, radio frequency (RF) signal, and so on. The signal transmitter 110 may also be referred to herein as a beacon. In some implementations, a strength of the signal can be measured to identify the distance from the mobile computing device 102 to the beacon, such as by measuring a received signal strength indicator (RSSI). The closer the mobile computing device 102 is to the beacon, the stronger the RSSI will be for the signal broadcast by the beacon. Additionally, the signals broadcast by the beacons can be received by the mobile computing device 102 without previous pairing. For example, the beacon can constantly or periodically broadcast the signal to enable the mobile computing device 102 to receive the signal as soon as the mobile device enters within range of the beacon.

The mobile computing device 102 is also illustrated as including a communication module 112 and a location module 114. The communication module 112 is representative of functionality to communicate via the network 108, such as with the computing device 104, one or more services of the service provider 106, and/or with the signal transmitters 110. As such, the communication module 112 may be configured in a variety of ways. For example, the communication module 112 may be configured as a browser that is configured to "surf the web." The communication module 112 may also be representative of network access functionality that may be incorporated as part of an application, e.g., to provide network-based functionality as part of the application, an operating system, and so on. In addition, the communication module 112 may be configured to receive the signals broadcast by the signal transmitter(s) 110. Thus, functionality represented by the communication module 112 may be incorporated by the mobile computing device 102 in a variety of different ways.

The location module 114 is representative of functionality to calculate a location of the mobile computing device 102 as well as an orientation of the mobile computing device 102. As such, the location module 114 may be configured in a variety of ways. For example, the location module 114 can be configured to triangulate or otherwise calculate the location of the mobile computing device 102 based on at least signals received from two or more signal transmitters 110. For greater accuracy, the mobile computing device 102 can use the signals received from three signal transmitters 110 to triangulate the location relative to the signal transmitters 110. For example, by calculating the distance to each of three signal transmitters 110, the mobile computing device 102 can accurately estimate its physical location relative to those three signal transmitters 110 by solving for triangles formed by the mobile computing device 102 and two respective signal transmitters 110.

In addition to triangulating the location of the mobile computing device 102, the location module 114 can obtain a compass heading that indicates an orientation of the mobile computing device 102, such as where the mobile computing device 102 is pointing. The orientation may correspond to a longitudinal axis, a latitudinal axis, or any other axis of the mobile computing device 102 that indicates a direction in which the mobile computing device 102 is pointing. In some implementations, the compass heading may indicate the orientation (e.g., bearing) relative to north, south, or any other suitable direction. In addition or in the alternative, the orientation may be relative to an axis formed between two of the signal transmitters 110, or an axis formed between the mobile computing device 102 and one of the signal transmitters 110. Thus, functionality represented by the location module 114 may be incorporated by the mobile computing device 102 in a variety of different ways.

The computing device 104 is also illustrated as including a communication module 116 and an application manager module 118. The communication module 116 is representative of functionality to communicate via the network 108, such as with one or more services of the service provider 106 and with the mobile computing device 102. As such, the communication module 116 may be configured in a variety of ways. For example, the communication module 116 may be configured as a browser that is configured to "surf the web." The communication module 116 may also be representative of network access functionality that may be incorporated as part of an application, e.g., to provide network-based functionality as part of the application, an operating system, and so on. In addition, the communication module 116 is representative of functionality to receive data transmitted by the mobile computing device 102 to control or interact with data displayed on a display device associated with the computing device 104. Thus, functionality represented by the communication module 116 may be incorporated by the computing device 104 in a variety of different ways.

The application manager module 118 is representative of functionality to manage an application executing on the computing device 104. As such, the application manager module 118 may be configured in a variety of ways. For example, the application manager module 118 may be configured to provide a user interface that is to be displayed on one or more associated display devices. In implementations, the application manager module 118 can initiate display of one or more objects via the user interface that can be interacted with (e.g., selected, modified, moved, and so on) based on user input. This interaction can be enabled by at least applying location data and orientation data associated with the mobile computing device 102 to correlate with display-location data corresponding to the data displayed via the user interface. Thus, functionality represented by the application manager module 118 may be incorporated by the computing device 104 in a variety of different ways, further discussion of which is provided below.

The service provider 106 is representative of functionality to provide one or more network-based services. The services are managed by a service manager module 120 to support a variety of different functionality. The services (e.g., web services), for instance, may be configured to support word processing, spreadsheets, graphics composition, graphics editing, sound editing, presentations, multimedia editing, three-dimensional scene rendering for video and/or film, video and/or motion graphics rendering, video transcoding, and so on. Thus, a variety of different types of content may be displayed and/or edited (e.g., created and/or modified) by the services, which may be maintained in the storage 122 of the service provider 106. Thus, a variety of different types of functionalities may be performed via services supported by the service provider 106.

The storage 122 may be a component of the service provider 106, may be remote from the service provider 106, or may be a third-party database. The storage 122 may be a single database, or may be multiple databases, at least some of which include distributed data. Thus, a variety of different types of storage mechanisms can be utilized for the storage 122.

Example Implementation

The following discussion describes example implementations of external device screen targeting that can be employed to perform various aspects of techniques discussed herein. The example implementations may be employed in the environment 100 of FIG. 1, the system 600 of FIG. 6, and/or any other suitable environment.

Figure 2:
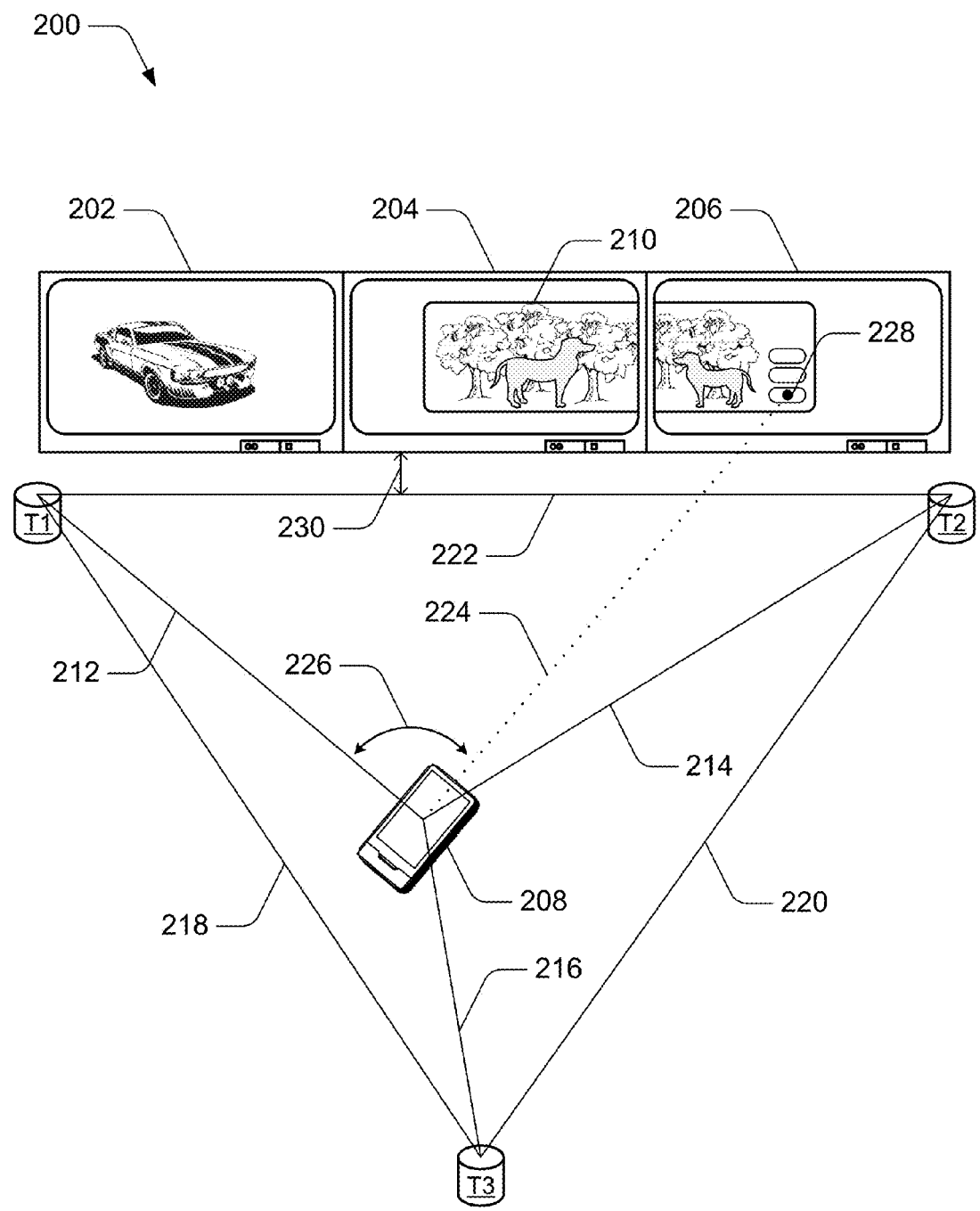
FIG. 2 is an illustration of an example implementation that is operable to employ techniques for external device screen targeting.

FIG. 2 is an illustration of an example implementation 200 that is operable to employ techniques for external device screen targeting. The illustrated implementation 200 includes multiple display devices 202, 204, and 206, a mobile device 208, and multiple signal transmitters T1, T2, and T3.

In the illustrated example, the display devices 202, 204, and 206 are located end to end in a group, sharing a common axis. However, the multiple display devices can be positioned in any suitable arrangement such as proximate one another top to bottom, side to side, or any combination thereof. Alternatively or in addition, the display devices can be spread apart, and can be placed in different areas, such as on different walls or in different corners of a room.

In implementations, the display devices 202, 204, and 206 can be collectively integrated with a computing device to display data of one or more applications via one or more user interfaces. The data can be displayed via an individual display device, all of the display devices, or a subset of the display devices. In some implementations, a display device can be tuned to a broadcast channel that is different than a broadcast channel of at least one other display device in the group. For example, display device 202 is illustrated as displaying a motor vehicle, whereas display devices 204 and 206 are sharing a display of dogs in a park via a user interface 210. Accordingly, any of the display devices in the group can be configured to individually display content unrelated to, and regardless of, content displayed by the other display devices. In addition, each display device in the group can also be configured to share a display of content from the same application with one or more additional display devices in the group. The displayed content, whether shared or not, can be collaborative and/or interactive.

According to various implementations, a plurality of signal transmitters can be positioned in different places corresponding to predefined locations. For example, signal transmitters T1 and T2 are illustrated as being located on opposing sides of the group of display screens, and signal transmitter T3 is located some distance from the display screens, such as at the back of a room. When the mobile device 208 enters within range of the signal transmitters T1, T2, and T3 and receives signals broadcast from the signal transmitters T1, T2, and/or T3, the mobile device 208 can use the received signals to calculate a distance from the mobile device 208 to each respective signal transmitter. For example, the mobile device 208 can measure the RSSI of a received signal to determine the distance to a respective signal transmitter.

Using the calculated distances, a location of the mobile device 208 can be triangulated. For example, using readings from the signal transmitters T1, T2, and T3, distances 212, 214, and 216 can be calculated, and distances 218, 220, and 222 between the signal transmitters can be identified. Using these six distances, three triangles can be solved. The solutions of these three triangles can then be averaged to accurately determine the physical location of the mobile device 208 relative to the signal transmitters T1, T2, and T3. In some implementations, the mobile device 208 can triangulate its own position. Alternatively or in addition, the mobile device 208 can send the measured distances 212, 214, and 216 to a computing device executing an application that is managing the displayed content on the display devices 202, 204, and/or 206 to enable the computing device to triangulate the location of the mobile device 208.

In addition, the mobile device 208 can obtain a compass heading that indicates an orientation of the mobile device 208. For example, the orientation of the mobile device 208 can identify which direction the mobile device 208 is pointing. In some implementations, the orientation of the mobile device 208 can be defined in relation to a reference direction. Any suitable reference direction can be utilized. For example, the reference direction can include true north, magnetic north, a direction from the mobile device 208 to one of the signal transmitters T1, T2, or T3, a direction from the mobile device 208 to a respective display screen, and so on. In implementations, the reference direction can be defined based on a compass heading corresponding to a respective display device.

In some implementations, the direction in which the mobile device 208 is pointing can correspond to an associated longitudinal axis. For example, a user can hold a mobile phone and point the top end of the mobile phone in a particular direction, such as toward one of the display devices 202, 204, or 206. By doing so, the longitudinal axis of the mobile phone can define the direction in which the mobile phone is pointing. Alternatively, the user can hold the mobile phone horizontally and point a side of the mobile phone toward the display device, such that a latitudinal axis corresponds with the orientation of the mobile phone. In yet another alternative implementation, the user can hold the mobile phone horizontally or vertically such that a z-axis of the mobile phone points to the display device. Thus, any of a variety of different orientations may be utilized to define where the mobile device 208 is pointing.

Continuing with the above example, the location of the mobile device 208 can be used to solve for a triangle defined by distances 212, 214, and 222. Then, angle 226 can be solved by subtracting respective compass headings of the mobile device 208 and of a respective display device. Using angle 226, an additional triangle defined by distances 212, 222, and 224 can be solved and corresponding results can be sent to the application manager module 118 (from FIG. 1) that is managing the content displayed on the display devices. These results can then be applied to correlate with display-location data of the application for interaction with the displayed content. In the illustrated example, the application manager module 118 has determined that the mobile device 208 is oriented toward location 228, and based on user input, via the mobile device 208 and transmitted to the application manager module 118, a displayed object corresponding to location 228 can be selected.

Consequently, by knowing the location and orientation of the mobile device 208, the application manager module 118 can determine a display location on one of the display devices 202, 204, and 206 that corresponds to where the mobile device 208 is pointing. Accordingly, the application manager module 118 can enable the mobile device 208 to control or interact with any of the display devices 202, 204, and 206, and/or content displayed on any of the display devices 202, 204, and 206.

In some implementations, the application manager module 118 can include an offset 230 between the display devices 202, 204, or 206 and an axis formed between the signal transmitters T1 and T2. In this way, the axis formed between the signal transmitters T1 and T2 is not required to lie in a plane defined by a surface of the display screens.

Figure 3:
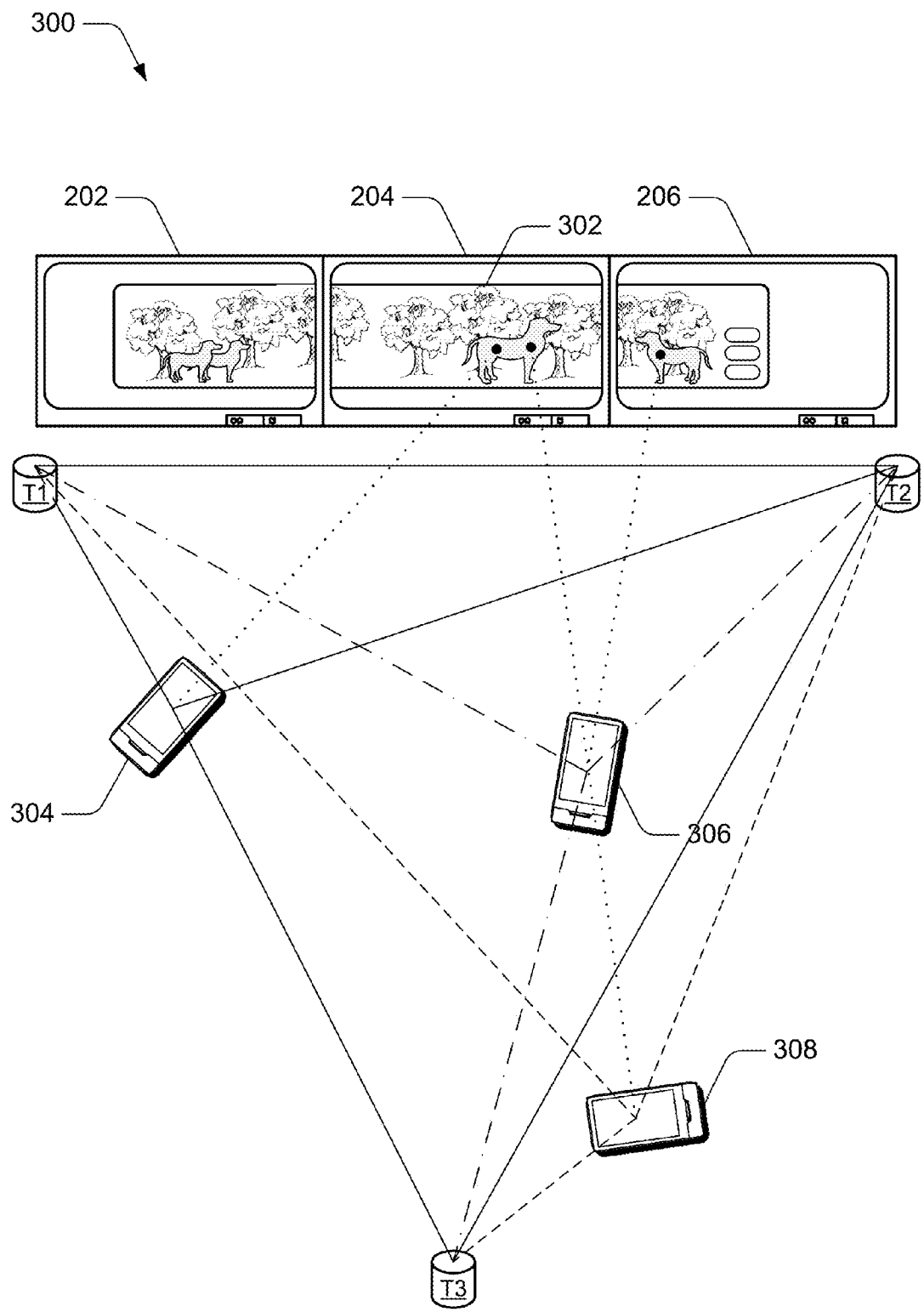
FIG. 3 is an illustration of an example multi-user, multi-screen implementation that is operable to employ techniques for external device screen targeting.

Having described an example implementation of external device screen targeting with a single mobile device, consider now FIG. 3, which is an illustration of an example multi-user, multi-screen implementation 300 that is operable to employ techniques for external device screen targeting. For example, an interactive presentation is displayed via a user interface 302 over multiple display devices 202, 204, and 206. Some examples include video games, collaborative presentations, audience polling, and so on. Several users operating mobile devices (e.g., devices 304, 306, and 308) can interact with objects displayed on any of the display devices 202, 204, and 206. In implementations, various users can interact with the objects simultaneously. In the illustrated example, the presentation includes a display of various dogs in a park, and the users that are within range of the signal transmitters T1, T2, and T3 can select one of the displayed dogs to vote for their favorite dog.

In the illustrated example, the location of the device 304 is calculated relative to the signal transmitters T1, T2, and T3, and an orientation of the device 304 is obtained based on a compass heading of the device 304. The location and orientation of the device 304 are then applied to correlate with display-location data of the application to determine that the device 304 is pointed at the large dog displayed on the display device 204. A user input via the device 304 can be sent to the application manager module managing the display of content to select the large dog. Similarly, the location of the device 306 is determined based on respective distances to each of the signal transmitters T1, T2, and T3, and the orientation of the device 306 is determined based on a corresponding compass heading. Using the location and orientation of the device 306, the application manager module 118 can determine that the device 306 is pointed at the display device 206 for interaction with the medium size dog displayed on the display device 206.

In addition, location and orientation information corresponding to the device 308 is determined and applied to correlate with the application data to determine that the device 308 is also pointing at the large dog displayed on the display device 204. The device 308 can select the large dog concurrently with selection of the same large dog by the device 304. Also, the orientation of device 308 corresponds to a latitudinal axis of the device 308, whereas the orientation of the devices 304 and 306 correspond to associated longitudinal axes. Accordingly, any suitable axis can be utilized to define the orientation of the mobile device. Further, line of sight is not required for interaction with displayed content. For example, the device 306 is illustrated as blocking the line of sight of the device 308. However, because the location and orientation information are wirelessly transmitted to the application manager module via a network, such as network 108 from FIG. 1, no line of sight is required to transmit such information.

Example Procedures

The following discussion describes techniques for external device screen targeting that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 4:
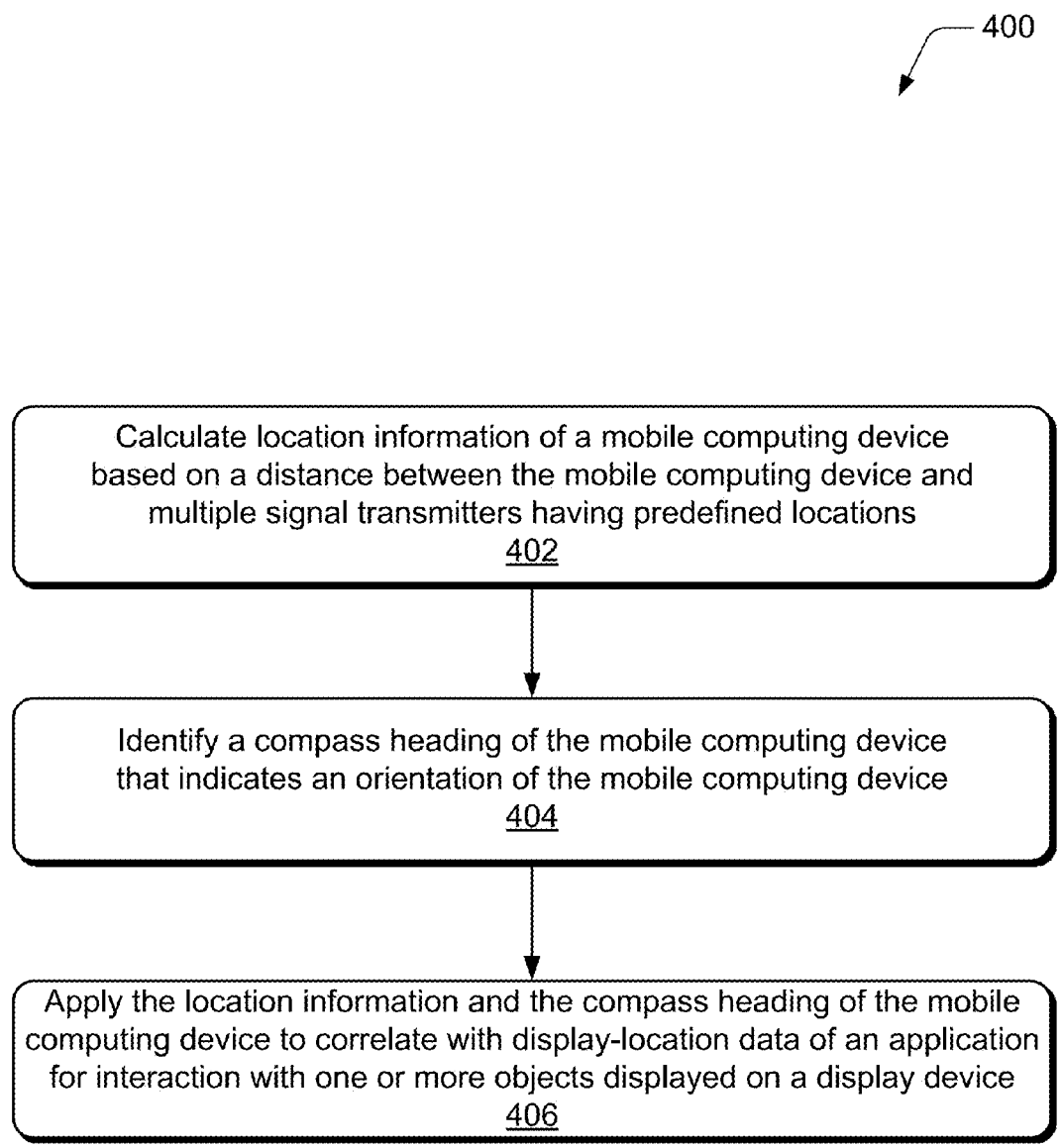
FIG. 4 is a flow diagram depicting a procedure in an example implementation in which techniques for external device screen targeting are employed.

FIG. 4 is a flow diagram depicting a procedure 400 in an example implementation in which techniques for external device screen targeting are employed. Location information of a mobile computing device is calculated based on distances between the mobile computing device and multiple signal transmitters having predefined locations (block 402). For example, the mobile computing device 102 of FIG. 1 can receive signals sent by the signal transmitters 110, and can determine a distance to each respective signal transmitter 110. In implementations, the mobile computing device 102 can determine the RSSI of each signal to determine distances to a source of the signal. Using the distances from two or more signal transmitters 110, the mobile computing device 102 can triangulate its location. Alternatively, the mobile computing device 102 can simply send the calculated distances to another device to calculate the location information of the mobile computing device 102 relative to the known locations of the signal transmitters 110.

A compass heading of the mobile computing device that indicates an orientation of the mobile computing device is identified (block 404). The mobile computing device 102 can obtain the compass heading by any suitable technique. For example, the mobile computing device 102 can use an integrated directional component that is configured to provide the compass heading of the mobile computing device 102 based on the orientation of the mobile computing device 102. The orientation of the mobile computing device 102 indicates where the mobile computing device 102 is pointing. In at least some implementations, the orientation can be defined in relation to a reference direction. In implementations, the orientation of the mobile computing device 102 can be relative to an axis formed between the mobile computing device 102 and one of the signal transmitters. Alternatively, the orientation can be relative to true north, magnetic north or south, an axis formed between the mobile computing device 102 and a display screen, and so on. Accordingly, any suitable reference direction can be utilized to define the orientation of the mobile computing device 102.

The location information and the compass heading of the mobile computing device is applied to correlate with display-location data of an application for interaction with one or more objects displayed on a display device (block 406). In at least one implementation, the location information can be sent to another device, such as the computing device 104 of FIG. 1, that is configured to execute an application that manages display of content on the display device. Using the location information and the orientation of the mobile computing device 102, a determination can be made as to where the mobile computing device 102 is pointing. If the mobile computing device 102 is oriented to point at a particular location on the display device, the application can identify that particular location, and determine if that particular location corresponds to any objects that might be displayed at the same location on the display device. Thus, the application can enable interaction between the mobile computing device 102 and a displayed object corresponding to the location on the display device where the mobile computing device 102 is pointing.

Figure 5:
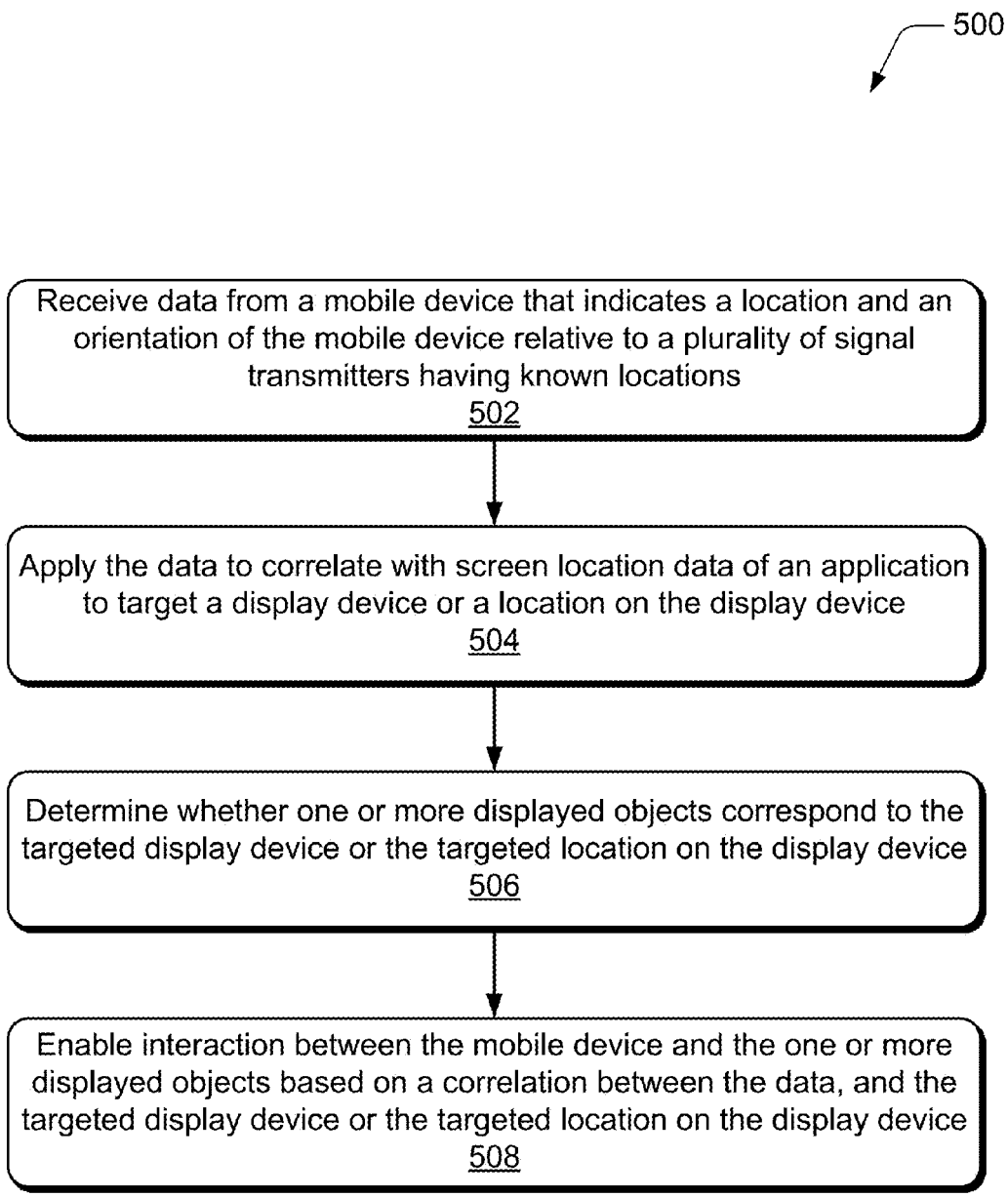
FIG. 5 is a flow diagram depicting a procedure in an example implementation in which techniques for external device screen targeting are employed.

Having discussed a general procedure with respect to FIG. 4, consider now a discussion of FIG. 5, which is a flow diagram depicting a procedure 500 in an example implementation in which techniques for external device screen targeting are employed. Data is received from a mobile device that indicates a location and an orientation of the mobile device relative to a plurality of signal transmitters having known locations (block 502). In one or more embodiments, the data includes location information of the mobile device that is based on measured distances from the mobile device to each of two or more of the signal transmitters.

Alternatively, the data can include measurements of the signals, such as RSSI measurements, to be subsequently used to calculate the location of the mobile device.

The data is applied to screen location data of an application to target a display device or a location on the display device (block 504). This step can be performed in any suitable way, examples of which are described above. A determination is made whether one or more displayed objects correspond to the targeted displayed device or the targeted location on the display device (block 506). In one or more implementations, a comparison can be made between a screen location of the one or more displayed objects, and the targeted display device or the targeted location on the display device.

Interaction is enabled between the mobile device and the one or more displayed objects based on a correlation between the data, and the targeted display device or the targeted location on the display device (block 508). The interaction can include operation of the targeted display device, such as volume control, channel change, power on/off, menu selection, and so on. In implementations, the interaction can include causing a cursor to hover over the one or more objects. In one or more implementations the interaction can include selection of the one or more objects to perform an action, examples of which are described above.

Using the above described techniques, different users can use mobile devices to interact with one or more applications displayed by multiple display devices. The mobile devices can collaboratively interact with the applications and the display devices, and can do so without line-of-sight and without previous pairing of devices.

Example System and Device

Figure 6:
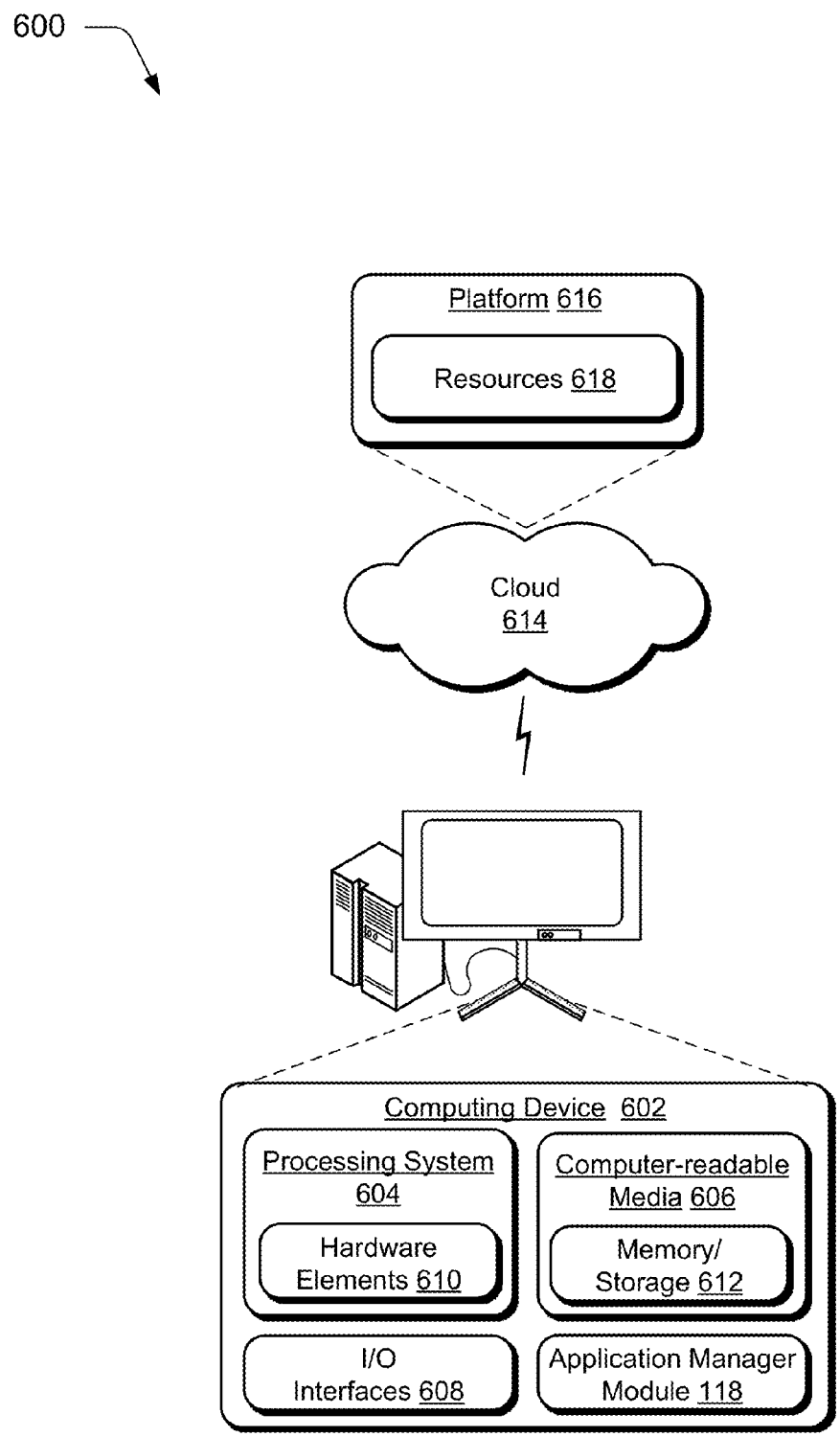
FIG. 6 illustrates various components of an example device that can be implemented as any type of computing device as described herein to implement the techniques described herein.

FIG. 6 illustrates an example system generally at 600 that includes an example computing device 602 that is representative of one or more computing systems and/or devices that may implement the various techniques described herein. This is illustrated through inclusion of application manager module 118, which may be configured to apply location data and orientation data of a mobile device to correlate with display-location data corresponding to data displayed by a display device, to enable interaction between the mobile device and the data displayed by the display device. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

Cloud 614 includes and/or is representative of a platform 616 for resources 618. Platform 616 abstracts underlying functionality of hardware (e.g., servers) and software resources of the cloud 614. Resources 618 may include applications and/or data that can be utilized while computer processing is executed on servers that are remote from the computing device 602. Resources 618 can also include services 620 provided over the Internet and/or through a subscriber network, such as a cellular or Wi-Fi network.

Platform 616 may abstract resources and functions to connect computing device 602 with other computing devices. Platform 616 may also serve to abstract scaling of resources to provide a corresponding level of scale to encountered demand for resources 618 that are implemented via platform 616. Accordingly, in an interconnected device embodiment, implementation of functionality described herein may be distributed throughout system 600. For example, the functionality may be implemented in part on computing device 602 as well as via platform 616 that abstracts the functionality of cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method, comprising:
    calculating location information of a mobile computing device based on a distance between the mobile computing device and multiple signal transmitters configured to broadcast signals to the mobile computing device from predefined locations independent from a location of a display device remote from the mobile computing device;
    identifying a compass heading of the mobile computing device that indicates an orientation of the mobile computing device; and
    applying the location information and the compass heading of the mobile computing device to correlate with display-location data of an application for interaction with one or more objects displayed on the display device.

2. A computer-implemented method as recited in claim 1, wherein the display device is one of multiple display devices that are used in combination to display content that is split across the multiple display devices.

3. A computer-implemented method as recited in claim 2, wherein the location information and the compass heading of the mobile computing device are usable to enable the mobile computing device to interact with each of the multiple display devices.

4. A computer-implemented method as recited in claim 1, further comprising:
    causing the application to be displayed on the display device;
    causing an additional application to be displayed on an additional display device, the application and the additional application being concurrently displayed; and
    allowing the mobile computing device to interact with both the application displayed on the display device and the additional application displayed on the additional display device.

5. A computer-implemented method as recited in claim 1, wherein said calculating the location of the mobile computing device includes triangulating a location of the mobile computing device based on the predefined locations of the multiple signal transmitters.

6. A computer-implemented method as recited in claim 1, further comprising:
   determining an additional compass heading defined by a longitudinal axis of the display device;
   using the additional compass heading of the display device in combination with the compass heading of the mobile computing device to calculate an angle between the compass heading of the mobile computing device and an axis formed from the mobile computing device to one of said signal transmitters;
   targeting a display region on the display device corresponding to a point at which the mobile computing device is pointing; and
   enabling interaction with at least one of the one or more objects displayed on the display device that corresponds to the orientation of the mobile computing device.

7. A system, comprising:
   one or more processors; and
   a memory having instructions that are executable by the one or more processors to implement an application manager module that is configured to:
      determine a physical location of a mobile device based on a distance between the mobile device and each of a plurality of signal transmitters, the distance based on a measured signal strength of signals broadcast from the plurality of signal transmitters to the mobile device, each signal transmitter of the plurality of signal transmitters being positioned at a location independent of physical locations corresponding to multiple display screens;
      receive a compass heading that identifies an orientation of the mobile device;
      select one of the multiple display screens that corresponds to the orientation of the mobile device; and
      target a display region on the selected display screen, the display region on the selected display screen being targeted based on the physical location of the mobile device, the compass heading, and a direction of a longitudinal axis of the display screen.

8. A system as recited in claim 7, wherein the physical location of the mobile device is determined when the mobile device enters an area that is within range of the plurality of signal transmitters.

9. A system as recited in claim 7, wherein the display region on the selected display screen is determined further based on an offset between the longitudinal axis of the selected display screen and an axis defined between two of the plurality of signal transmitters.

10. A system as recited in claim 7, wherein the application manager module is configured to split content for display across the multiple display screens.

11. A system as recited in claim 7, wherein the application manager module is configured to split content for display across the multiple display screens and enable the mobile device to individually interact with the content via each respective display screen.

12. A system as recited in claim 7, wherein the application manager module is configured to:
   cause a first application to be displayed on a first display screen;
   cause a second application to be concurrently displayed on a second display screen; and
   allow the mobile device to interact with both the first application displayed on the first display screen and the second application displayed on the second display screen, wherein interaction with the first application and the second application is based on both the physical location and the compass heading of the mobile device.

13. A system as recited in claim 7, wherein the physical location of the mobile device is triangulated using the plurality of signal transmitters.

14. Computer-readable storage memory comprising stored instructions that are executable by a computing device to implement a screen targeting module configured to perform operations comprising:
   targeting a display device or a display region on the display device based on data received from a mobile device, the data indicating a physical location of the mobile device relative to a plurality of signal transmitters configured to broadcast signals to the mobile device from known locations, the known locations of the plurality of signal transmitters being independent of a physical location of the display device, the data further indicating an orientation of the mobile device; and
   applying the data to correlate with display-location data of an application to allow the mobile device to interact with one or more displayed objects that correspond to the display device or the display region on the display device that correlates to the orientation of the mobile device.

15. Computer-readable storage memory as recited in claim 14, wherein the plurality of signal transmitters are configured to transmit signals to enable the mobile device to calculate a distance between the mobile device and each of the plurality of signal transmitters.

16. Computer-readable storage memory as recited in claim 14, wherein said applying the data to correlate with the display-location data of the application includes using the physical location of the mobile device and the orientation of the mobile device relative to a longitudinal axis of the display device to calculate the display region on the display device.

17. Computer-readable storage memory as recited in claim 14, wherein the display device is one of a plurality of display devices that are configured to display content split across the plurality of display devices.

18. Computer-readable storage memory as recited in claim 14, wherein the display device is one of a plurality of display devices that are configured to display content split across the plurality of display devices, and wherein the physical location and the orientation of the mobile device are usable to enable the mobile computing device to interact with each of the plurality of display devices.

19. Computer-readable storage memory as recited in claim 14, wherein the physical location of the mobile device is determined by triangulating the mobile device's position relative to the plurality of signal transmitters.

20. Computer-readable storage memory as recited in claim 14, wherein said applying the data to correlate with the display-location data of the application includes applying an offset distance between a longitudinal axis of the display screen and an axis formed between two of the plurality of signal transmitters.

* * * * *